Oct. 28, 1958     R. A. CAIL     2,857,802
DISPLACEMENT MEASURING DEVICE USING THE
LIGHT PATTERN FROM OPTICAL GRATINGS
Filed Aug. 22, 1955
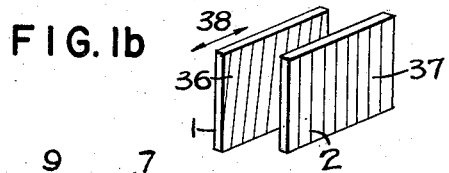
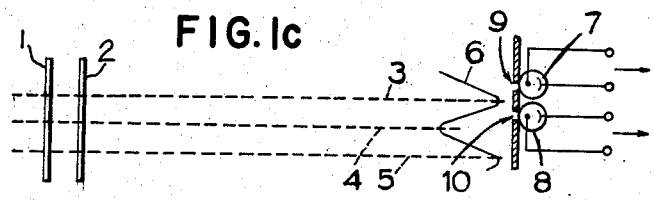
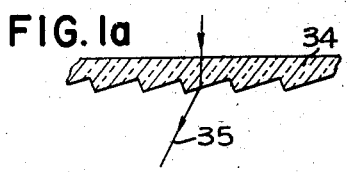
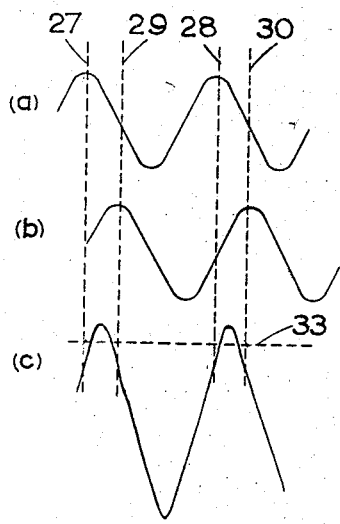
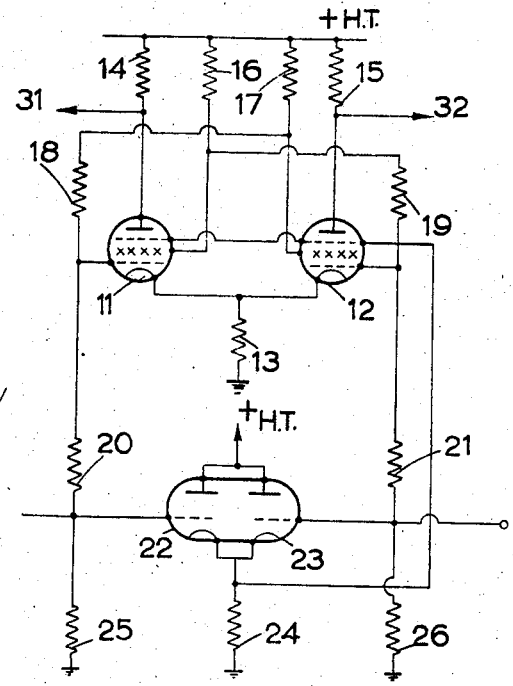
Inventor
R. A. Cail

United States Patent Office 2,857,802
Patented Oct. 28, 1958

2,857,802

DISPLACEMENT MEASURING DEVICE USING THE LIGHT PATTERN FROM OPTICAL GRATINGS

Roland Allan Cail, Slough, England, assignor to Electric & Musical Industries Limited, Hayes, Middlesex, England, a company of Great Britain Application August 22, 1955, Serial No. 529,720

Claims priority, application Great Britain September 7, 1954

2 Claims. (Cl. 88—14)

This invention relates to displacement measuring devices.

In the accompanying drawings:

Figure 1a illustrates a sectional view of an optical grating of the kind known as an echelette grating, Figure 1b illustrates an arrangement of two such gratings which has been proposed for measuring displacement, Figure 1c illustrates an arrangement of gratings and photo-electric cells in a displacement measuring device in accordance with one example of the present invention, Figure 2 illustrates one example of a circuit for use with the photo-electric cells shown in Figure 1c, and Figure 3 comprises waveform diagrams explanatory of the operation of Figure 2.

The echelette grating which is shown in Figure 1a is a transmission grating having a sawtooth outline in transverse section, a section being indicated by the reference numeral 34. The path of a ray of light incident on and diffracted by the grating is shown at 35. It has been proposed to measure displacement with the aid of diffraction gratings such as shown in Figure 1a and for this purpose two such gratings of equal pitch may be superimposed so that the diffracting surfaces are slightly inclined to each other, the gratings being attached to two objects whose relative displacement is to be measured. This is illustrated in Figures 1b and 1c of the accompanying drawing in which references 1 and 2 denote fragments of the two gratings, and the lines 36 and 37 represent the edges of the respective elementary prisms formed by the sawtooth outlines the lines 36 of the grating 1 being slightly inclined to the lines 37 of the grating 2 as shown. When light is transmitted through the gratings so-called moire fringes are formed extending approximately at right angles to the grating lines. Thus the transmitted light has intensity variations in a plane parallel to the gratings as represented by the waveform 6, in Figure 1c, the lines 3, 4 and 5 corresponding to extrema in this waveform. If one of the gratings is displaced relative to the other in either direction of the line 38 in Figure 1b, which is equivalent to displacement in a direction perpendicular to the plane of Figure 1c, the fringes move at right angles to the direction of movement of the grating at a greatly magnified rate, and provide a means of accurately measuring extremely small displacements, for example by counting the moire fringes. The arrangement disclosed may thus be used in automatic machines for measuring displacements of servo controlled parts. However, one difficulty associated with measurement by this arrangement is that of determining the sense of the displacement.

The object of the present invention is to reduce the difficulty indicated.

According to the present invention there is provided a displacement measuring device, comprising two optical gratings adapted to produce a repeating light pattern which, in response to relative displacement between said gratings, undergoes a corresponding displacement, photo-electrically sensitive means arranged to observe said light pattern at two positions such that in response to displacement of said pattern two electrical waveforms are produced having a phase difference of less than 180°, a two-state circuit, means for applying said waveform to said circuit to cause successive transitions of said circuit between its two states, means for deriving a waveform having a peak value occurring between adjacent peaks in said first-mentioned waveform, and means responsive to the condition of said circuit at the occurrence of peaks of said derived waveform to indicate the sense of the displacement.

In order that the invention may be clearly understood and readily carried into effect, particular reference will now be made to the example of the invention shown in Figures 1c and 2 of the drawings.

As shown in these figures, two photo-electric cells 7 and 8 located behind windows 9 and 10 are provided as shown in Figure 1c to observe the light pattern produced by the two optical gratings the windows being disposed in a plane parallel to the gratings. The windows are displaced from each other by about 90°, taking the distance between adjacent light maxima as 360°. The photo-electric cells 7 and 8 produce electrical waveforms representing the pattern movement when relative displacement occurs between the prisms and by counting positive peaks in the electrical waveforms by means of electronic counters, the displacements can be measured. Moreover if the light maxima are observed by the photo-cell 7 before photo-cell 8, the displacement has one sense, whereas if the maxima are observed by the cell 8 before the cell 7 the displacement has the opposite sense.

A circuit shown in Figure 2 comprises two valves 11 and 12, shown as pentodes, coupled at their cathodes by resistor 13. The valves have anode load resistors 14 and 15 and screen resistors 16 and 17 and the screen electrodes and control electrodes of the valves are cross-coupled as shown via the resistors 18 and 19. The valves 11 and 12 thus have inner triode sections which are cross coupled to form a two state circuit. The output of one of the photo-cells, say the photo-cell 7 of Figure 1c, is applied to the control electrode of valve 11 via resistor 20 whilst the output of the other photo-cell, namely the cell 8, is applied to the control electrode of the valve 12 via resistor 21. The two photo-cell outputs are also applied respectively to the control electrodes of two triode valves 22 and 23 which have a common cathode load 24. There is moreover a connection from the cathodes of the valves 22 and 23 to the so-called suppressor electrodes of the valves 11 and 12 so that the waveform set up across resistor 24 is applied in parallel to the last-mentioned electrodes. The suppressor electrodes thus function as outer control electrodes. The anodes of the valves 22 and 23 are connected directly to the positive High Tension line, and resistors 25 and 26 are leak resistors.

In describing the operation of the circuit, it will be assumed in the first instance that the waveform (a) of Figure 3 represents a fragment of the light waveform observed by the photo-cell 7 and therefore a fragment of the electrical waveform applied to the control electrodes of the valves 11 and 22. Similarly the waveform (b) of Figure 3 is a fragment of the waveform observed by the photo-cell 8 and applied to the control electrodes of the valves 12 and 23. Therefore the fringes are moving in a downward direction as seen in Figure 1c. The waveform (a) has peaks at the times represented by the lines 27 and 28 whilst waveform (b) has peaks at the times represented by the lines 29 and 30. Adjacent peaks in the two waveforms are spaced by approximately 90°. The two state circuit formed by the inner triode sections of the valves 11 and 12 is thus switched in succession between alternate states in response to the peaks in the waveform (a) and (b), the peaks in the waveform (a) causing a switch to the state with the valve 11 conducting, and the peaks in the waveform (b) causing a switch to the state with the valve 12 conducting. Waveform (c) represents a fragment of the waveform set up across the cathode resistor 24 by virtue of the action of the valves 22 and 23 in combining the waveforms (a) and (b), the waveform (c) having peaks occurring between the peaks in the waveforms (a) and (b). The waveform (c) is applied to the suppressor electrodes of the valves 11 and 12 and the circuit is so arranged that anode current can flow in either valve only when the potential applied to the suppressor electrodes exceeds the threshold indicated by the dotted line 33 in Figure 3. Therefore, in the case indicated anode current flows only in the valve 11 in response to the waveform (c), since the valve 12 is switched off at the relevant time, and a corresponding pulse output is set up at output terminal 31. By counting the pulses delivered to the output terminal 31 an indication of the magnitude of the displacement is obtained and the sense is indicated by the fact that the output comes from 31. If for any reason the senses of the displacement alters, the waveforms (a) and (b) are interchanged and the conducting condition of valve 12 now precedes that of the valve 11. Only the valve 12 now sets up current pulses in its anode circuit in response to the waveform (c) and the fact that the pulse output is now obtained at the output terminal 32 is an indication of the reversed sense of the displacement. The magnitude of the reversed displacement can now be determined by counting the pulses delivered to the terminal 32.

Any suitable form of electronic counter, such as a dekatron, may be used for counting the output pulses, the pulses appearing on the lead 31 being applied to the "add" input terminal of the counter and pulses appearing in the lead 32 being applied to the "subtract" input terminal of the counter.

The principle of sense detection described with reference to Figure 2 may of course be achieved with other circuit arrangements than that shown in Figure 2. For example the waveform (c) may be applied to two gates separate from the trigger circuit to which the waveforms (a) and (b) are applied, the gates being selectively conditioned to transmit the waveform (c) in dependence upon the state of the trigger circuit. The phase displacement between the waveforms may, moreover, differ from 90°, provided it differs substantially from 180°. Moreover, instead of using gratings of equal pitch but having their grating lines inclined, gratings having their lines parallel but having slightly different pitches (differing by say 1 percent) may be used.

What I claim is:

1. A displacement measuring device comprising two optical gratings disposed to produce a light pattern which undergoes a cyclic variation in response to relative displacement between said gratings, and photo-electrically sensitive means for observing said light pattern at two positions and responsive to cyclic variation of said waveform to produce two similar electrical waveforms having a phase difference of less than 180°, a two state circuit, circuit connections from said observing means to said two state circuit to cause successive transitions of said circuit between its two states, a combining circuit for combining said waveforms to derive a composite waveform having a peak value occurring between adjacent peaks in the first mentioned waveforms, two counting channels, and gating means responsive to the condition of said two state circuit for transmitting said composite waveform selectively to said counting channels in dependence upon the sense of the displacement.

2. A displacement measuring device comprising two optical gratings disposed to produce a light pattern which undergoes a cyclic variation in response to relative displacement between said gratings, and photo-electrically sensitive means for observing said light pattern at two positions and responsive to cyclic variation of said waveform to produce two similar electrical waveforms having a phase difference of less than 180°, a two state circuit, circuit connections from said observing means to said two state circuit to cause successive transitions of said circuit between its two states, a combining circuit for combining said waveforms to derive a composite waveform having a peak value occurring between adjacent peaks in the first mentioned waveforms, two counting channels, and gating means responsive to the condition of said two state circuit for transmitting said composite waveform selectively to said counting channels in dependence upon the sense of the displacement, in which said two state circuit comprises the inner sections of two valves and cross couplings between said inner sections, and said gating means responsive to the condition of said two state circuit comprises the outer control electrodes of said two valves, to which said composite waveform is applied.

References Cited in the file of this patent

UNITED STATES PATENTS

| | | |
|---|---|---|
| 1,415,627 | Giambiasi | May 9, 1922 |
| 2,462,292 | Snyder | Feb. 22, 1949 |
| 2,479,802 | Young | Aug. 23, 1949 |
| 2,596,752 | Williams | May 13, 1952 |
| 2,604,004 | Root | July 22, 1952 |
| 2,656,106 | Stabler | Oct. 20, 1953 |